United States Patent
Carmen et al.

(10) Patent No.: US 9,777,862 B2
(45) Date of Patent: Oct. 3, 2017

(54) FORCE ACTUATED CONTROL VALVE

(71) Applicant: ILLINOIS TOOL WORKS INC., Glenview, IL (US)

(72) Inventors: Brad G. Carmen, Chicago, IL (US); Robert W. Altonji, Quakertown, PA (US); Joseph C. Dille, Telford, PA (US); Stephen R. Kramer, Perkiomenville, PA (US)

(73) Assignee: ILLINOIS TOOL WORKS INC., Glenview, IL (US)

( * ) Notice: Subject to any disclaimer, the term of this patent is extended or adjusted under 35 U.S.C. 154(b) by 0 days.

(21) Appl. No.: 14/759,679

(22) PCT Filed: Jan. 7, 2014

(86) PCT No.: PCT/US2014/010522
§ 371 (c)(1),
(2) Date: Jul. 8, 2015

(87) PCT Pub. No.: WO2014/110044
PCT Pub. Date: Jul. 17, 2014

(65) Prior Publication Data
US 2015/0345654 A1   Dec. 3, 2015

Related U.S. Application Data

(60) Provisional application No. 61/750,040, filed on Jan. 8, 2013.

(51) Int. Cl.
*F16K 1/36* (2006.01)
*F16K 31/06* (2006.01)
(Continued)

(52) U.S. Cl.
CPC .............. *F16K 31/061* (2013.01); *F16K 1/36* (2013.01); *F16K 1/42* (2013.01); *F16K 25/00* (2013.01);
(Continued)

(58) Field of Classification Search
CPC ........ F16K 31/061; F16K 31/126; F16K 1/36; F16K 31/0655; F16K 1/42; F16K 25/00; F16K 31/02; G05D 7/0635
(Continued)

(56) References Cited

U.S. PATENT DOCUMENTS 2,218,871 A * 10/1940 Broden ...................... F16K 1/00
251/333
2,812,776 A * 11/1957 Lofftus ............... F16K 31/0627
137/625.27
(Continued)

FOREIGN PATENT DOCUMENTS

CN  101133270 A   2/2008
GB     21236 A   0/1912
(Continued)

OTHER PUBLICATIONS

International Search Report and Written Opinion, mailed May 2, 2014; PCT International Application No. PCT/US14/010522.
(Continued)

*Primary Examiner* — John Bastianelli
(74) *Attorney, Agent, or Firm* — McGuireWoods LLP

(57) ABSTRACT

A force actuated modulating control valve such as a direct acting solenoid valve or pilot actuated bellows valve with a knife edge seat so that the metering location on the seat is at the very outer diameter. In one embodiment, a portion of the valve seat outside of the metering edge is removed to substantially the outside diameter to reduce contact with high velocity fluid flow. In certain embodiments, a flow shield may be positioned just outside of the metering edge of the seat to prevent the high velocity fluid from circulating toward parts of the spool assembly. In some embodiments, the flow shield may be fixed to the body of the instrument so all fluid forces are transmitted to the body. Embodiments
(Continued)

of the force actuated modulating control valve may be employed in a mass flow controller for controlling fluid flow.

18 Claims, 17 Drawing Sheets

(51) Int. Cl.
  *F16K 31/126* (2006.01)
  *F16K 31/02* (2006.01)
  *F16K 1/42* (2006.01)
  *F16K 25/00* (2006.01)
  *G05D 7/06* (2006.01)
(52) U.S. Cl.
  CPC .......... *F16K 31/02* (2013.01); *F16K 31/0655* (2013.01); *F16K 31/126* (2013.01); *G05D 7/0635* (2013.01)
(58) Field of Classification Search
  USPC ......... 251/129.15, 333, 282, 129.01, 129.07, 251/129.11, 360; 137/486, 487.5
  See application file for complete search history.

(56) References Cited

U.S. PATENT DOCUMENTS

| | | | | |
|---|---|---|---|---|
| 2,963,267 A | * | 12/1960 | Bancroft | F16K 31/0658 251/333 |
| 3,195,552 A | * | 7/1965 | Rasmussen | F16K 49/00 137/315.27 |
| 3,881,505 A | | 5/1975 | Dunkelis | |
| 4,666,126 A | * | 5/1987 | Tujimura | F16K 1/34 251/282 |
| 4,893,782 A | * | 1/1990 | Franke | F16K 1/422 251/333 |
| 5,159,951 A | | 11/1992 | Ono et al. | |
| 6,149,124 A | | 11/2000 | Yang | |
| 6,390,445 B2 | * | 5/2002 | Fukano | G05D 16/2013 251/129.15 |
| 6,505,812 B1 | | 1/2003 | Anastas | |
| 7,387,135 B2 | * | 6/2008 | Anastas | F16K 1/36 137/454.2 |
| 2010/0243076 A1 | * | 9/2010 | Hayashi | F16K 7/14 137/455 |
| 2011/0168279 A1 | | 7/2011 | Nishimura | |
| 2012/0323379 A1 | | 12/2012 | Robertson, III | |

FOREIGN PATENT DOCUMENTS

| | | |
|---|---|---|
| WO | 2008035193 A1 | 3/2008 |
| WO | 2012173920 A1 | 12/2012 |

OTHER PUBLICATIONS

European Extended Search Report date mailed Aug. 10, 2016; European Patent Application No. 14738083.6.

\* cited by examiner

FORCE ACTUATED CONTROL VALVE

BACKGROUND OF THE INVENTION

1. Field of the Invention

The present invention relates to the field of flow control, and more particularly, to a force actuated modulating control valve.

2. Discussion of the Related Art

A valve is a device that regulates, directs or controls the flow of a fluid (gases, liquids, fluidized solids, or slurries) by opening, closing, or partially obstructing various passageways. One type of valve is a solenoid valve. Solenoid valves are the most frequently used control elements in fluidics. Solenoid valves are controlled by an electric current through a solenoid that converts electrical energy into mechanical energy which, in turn, opens or closes the valve mechanically. Solenoid valves offer fast and safe switching, high reliability, long service life, good medium compatibility of the materials used, low control power and compact design.

BRIEF SUMMARY OF THE INVENTION

Embodiments of the present invention include a force actuated modulating control valve comprising a valve seat having a reduced diameter downstream of a metering location to reduce contact with a high velocity flow stream during operation. In one embodiment, the reduced diameter occurs for only a bottom portion of the valve seat. In other embodiments, the reduced diameter downstream of the metering location occurs for an entire portion of the valve seat. In certain embodiments, the valve seat has a knife edge seat such that the metering location is at an outer diameter of the valve seat. Still, in certain embodiments, the force actuated modulating control valve includes a flow shield positioned just outside of a metering location of the valve seat to prevent a high velocity fluid from circulating toward parts of a spool assembly. In one embodiment, the flow shield is fixed to a body of an instrument so fluid forces are transmitted to a body of the instrument. Example embodiments of the disclosed force actuated modulating control valve are applicable to direct acting solenoid valves and pilot actuated bellows valves. Additionally, embodiments of the disclosed force actuated modulating control valve are applicable to pressure balanced as well as non-pressure balanced valves.

Moreover, embodiments of the force actuated modulating control valve may be employed in a mass flow controller for controlling fluid flow. For instance, in one embodiment, the mass flow controller comprises an inlet for receiving the fluid; a flow path in which the fluid passes through the mass flow controller; a mass flow meter for providing a signal corresponding to mass flow of the fluid through the flow path; a force actuated modulating control valve for regulating the flow of the fluid out of an outlet of the mass flow controller, the force actuated modulating control valve comprising a valve seat having a reduced diameter downstream of a metering location to reduce contact with a high velocity flow stream during operation; and a controller configured to apply a valve control signal to adjust the force actuated modulating control valve to a desired valve position to control the flow of the fluid out of an outlet of the mass flow controller.

Additional embodiments, advantages, and novel features are set forth in the detailed description.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION

The disclosed embodiments and advantages thereof are best understood by referring to FIGS. 1-20 of the drawings, like numerals being used for like and corresponding parts of the various drawings. Other features and advantages of the disclosed embodiments will be or will become apparent to one of ordinary skill in the art upon examination of the following figures and detailed description. It is intended that all such additional features and advantages be included within the scope of the disclosed embodiments. Further, the illustrated figures are only exemplary and are not intended to assert or imply any limitation with regard to the environment, architecture, design, or process in which different embodiments may be implemented.

A direct acting solenoid valve is often used for precision flow control as it offers practically infinite resolution, has fast response, and has virtually no hysteresis. This type of valve sets its position by maintaining equilibrium between the force of the solenoid and the restoring force of the spring(s). In addition, this type of valve also has no moving seals and generates no wear as a result of its operation.

Figure 1:
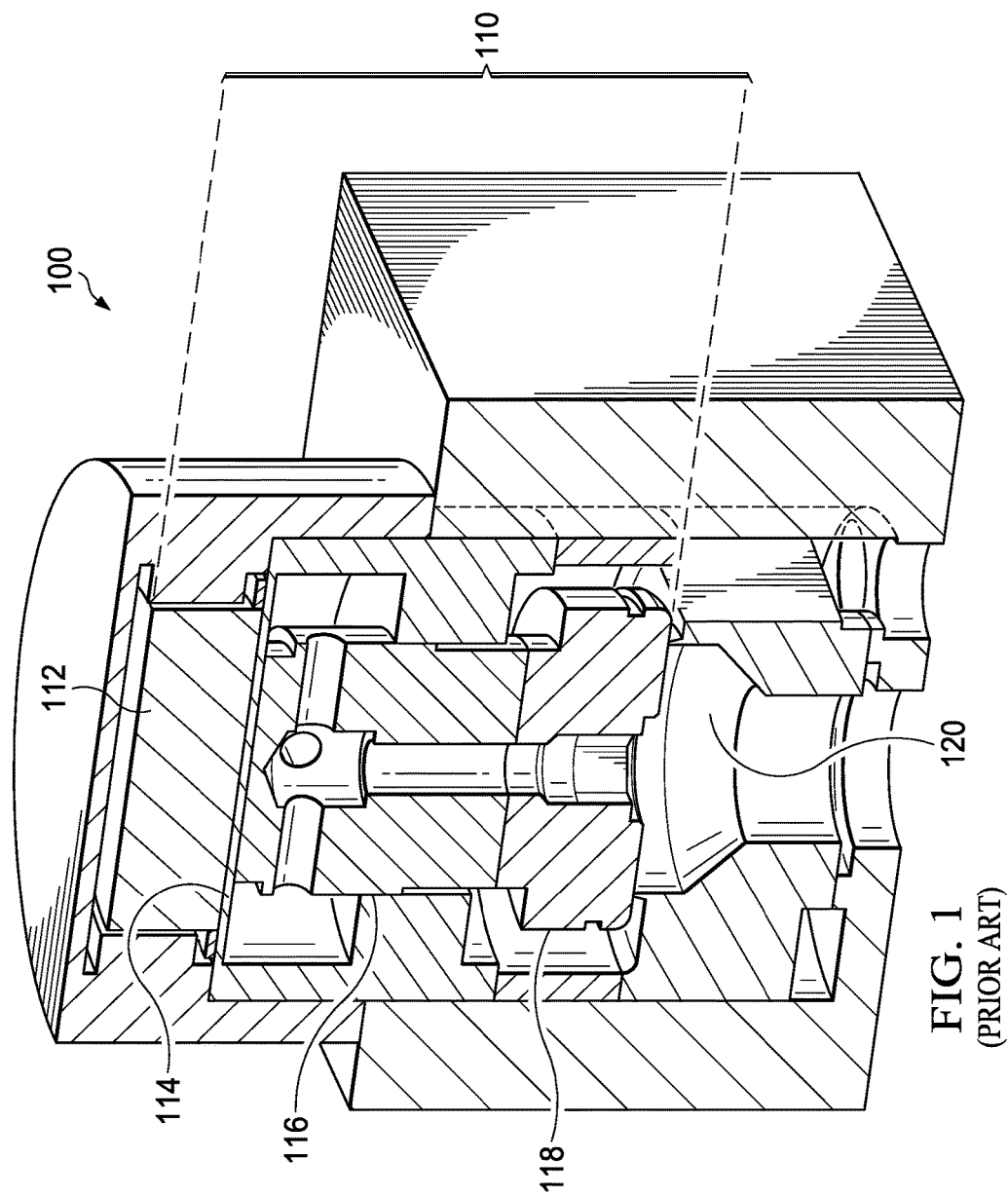
FIG. 1 is a diagram that illustrates a typical force actuated valve of a pressure balanced type in accordance with the disclosed embodiments.

As an example, FIG. 1 depicts the major components in a typical direct acting solenoid valve 100. The solenoid valve 100 includes a spool assembly 110 and a metering orifice 120. Spool assembly 110 includes a magnetic plunger 112, a spring 114, a tapered plunger 116, and a valve seat 118. A downside of the design of the solenoid valve 100 is that if there is anything that imparts an additional force on spool assembly 110, then it will upset the equilibrium position. When the equilibrium position is disrupted, the metered flow will change. If the flow change causes a force change on the valve's spool assembly 110, then there is a possibility for an unstable feedback that can result in instability or oscillation.

Figure 2A:
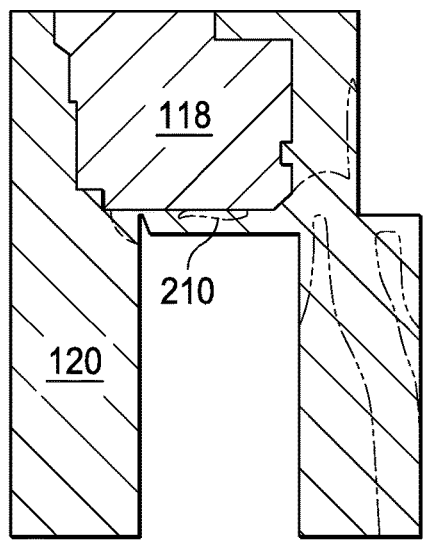
FIGS. 2A and 2B are diagrams that illustrate an example of a change in flow profile as a result of a small change in valve position in accordance with the disclosed embodiments.
Figure 2B:
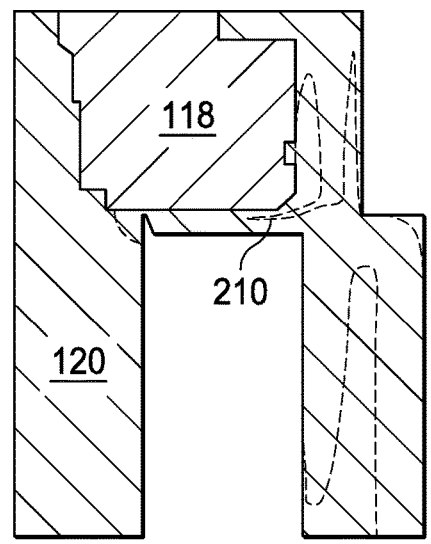

In accordance with the disclosed embodiments, the inventors of the claimed inventions determined that the flow velocity field is unstable with respect to valve displacement as it leaves the metering portion of the valve. For instance, FIGS. 2A and 2B depict the change in flow profile as a result of a small (0.001") change in valve position. For example, FIG. 2A depicts the flow profile at 0.015" of valve displacement. As illustrated in the diagram, high velocity flow 210 is attached to the bottom of a valve seat 118. In contrast, FIG. 2B depicts the flow profile at 0.065" of valve displacement in which high velocity flow 210 is detached from the valve seat 118. This causes instability of the pressure forces on the valve spool assembly 110 that results in a motion of the spool assembly 110 causing the metered flow to be unstable. This problem is worse for smaller metering orifices 120 when the valve seat 118 is substantially larger than the orifice 120 and low outlet pressure. In particular, the solenoid valve 100 is particularly prone to oscillation when the instrument is operated with high inlet pressures and low outlet pressures. In addition, operation into a vacuum is very prone to cause oscillation.

In accordance with one disclosed embodiment, the inventors determined that one solution is to add a damper to the spool assembly 110 to improve stability. However, a damper may slow response, add hysteresis and possibly have elements that will wear under operation. Another potential solution is to increase the natural frequency of the spool assembly 110 by increasing the stiffness of the springs. This modification may only be marginally effective as the natural frequency is a weak function of the stiffness and increasing the stiffness increases the power required to maintain valve position.

Figure 3A:
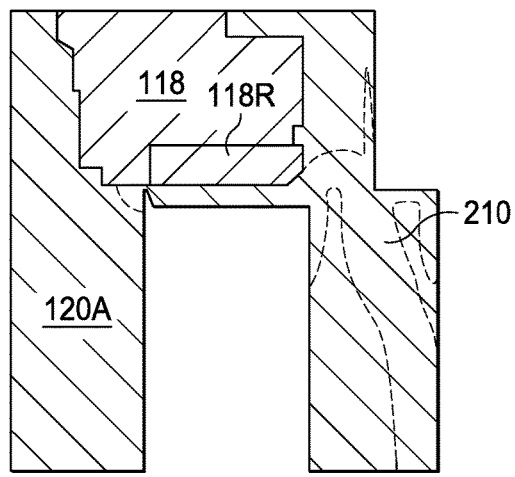
FIGS. 3A-3D are diagrams that illustrate examples of a valve with a notched seat in accordance with the disclosed embodiments.
Figure 3B:
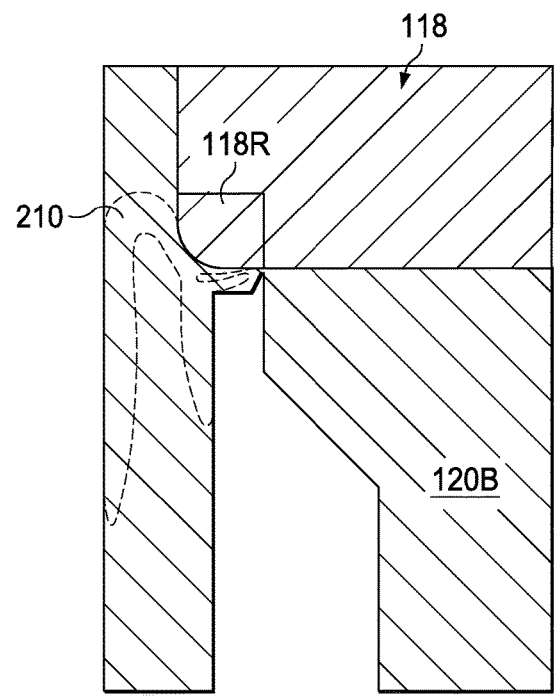
Figure 3C:
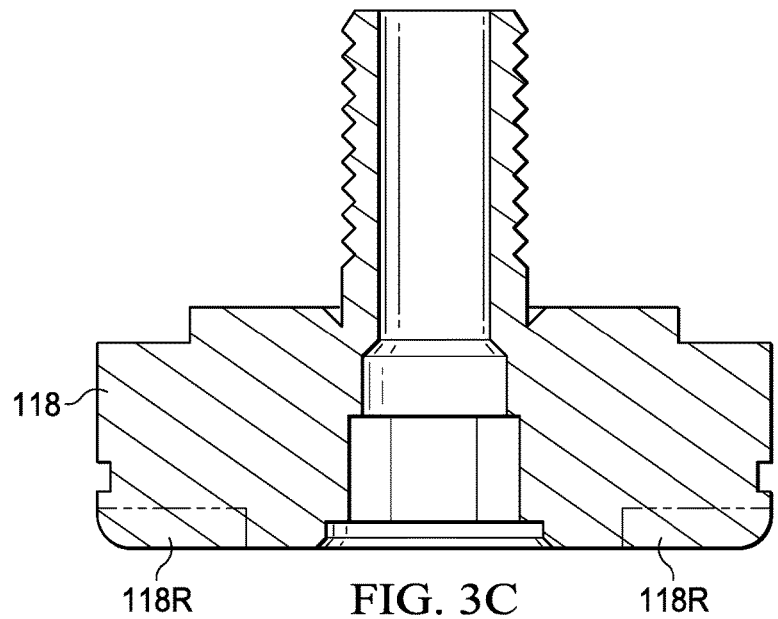
Figure 3D:
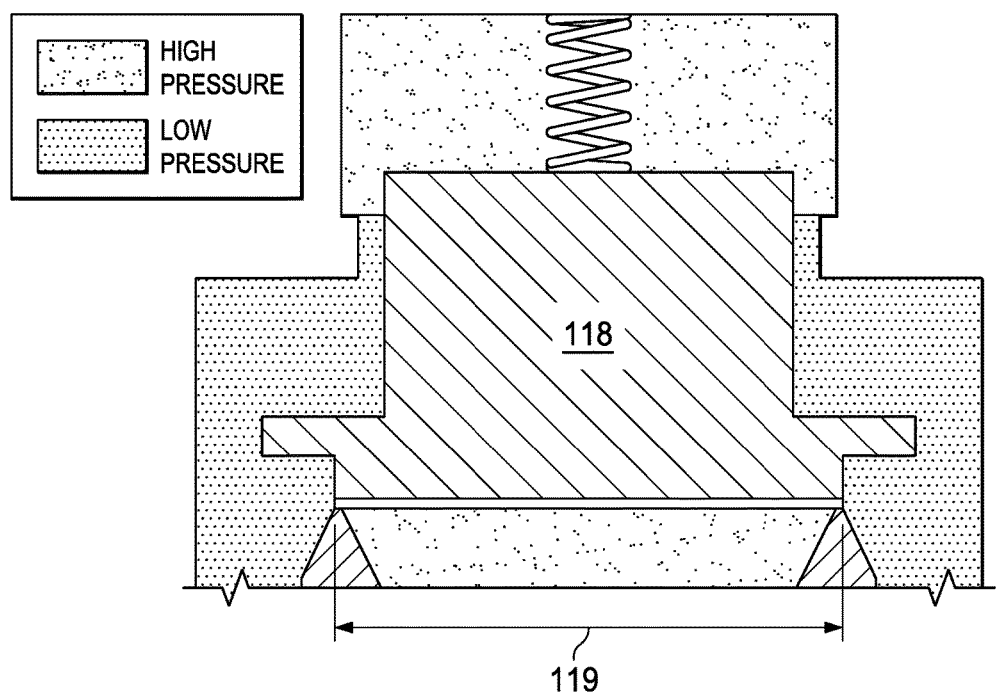

Thus, the inventors determined that a better way to reduce the problem is to modify the design of the valve. In particular, in one embodiment, as shown in the various examples depicted in FIGS. 3A-3C, a portion 118R of the valve seat 118 downstream of the metering orifices 120A or 120B is removed. By doing so, the disclosed embodiment takes the valve seat 118 away from the high velocity flow stream during operation. With the valve seat 118 out of the flow stream, the force change with position is greatly reduced. For instance, in one embodiment, a diameter 119 of the valve seat 118 on the flow discharge region is reduced as shown in FIG. 3D.

Figure 4A:
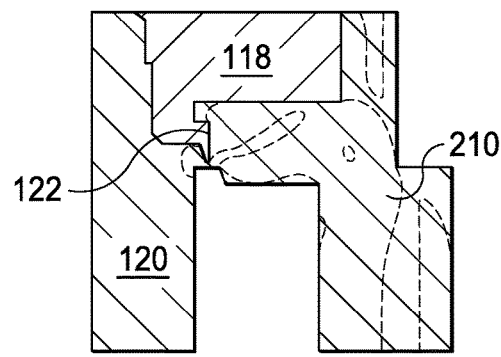
FIGS. 4A-4C are diagrams that illustrate examples of a valve with a knife edge seat in accordance with the disclosed embodiments.
Figure 4B:
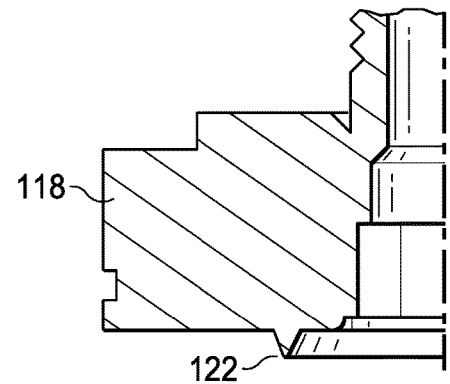

In another embodiment, an additional improvement to the valve seat 118 is to reduce the contact to a point by using a knife edge 122 and removing the components of the valve spool away from the flow exit of the metering gap as shown in the different embodiments depicted in FIGS. 4A and 4B. The knife edge 122 promotes flow separation from the valve seat 118 at the earliest moment. In a preferred embodiment, the knife edge 122 should be as thin as possible so that pressure variations under the valve seat 118 area will not have a significant effect of the force on the valve.

Figure 4C:
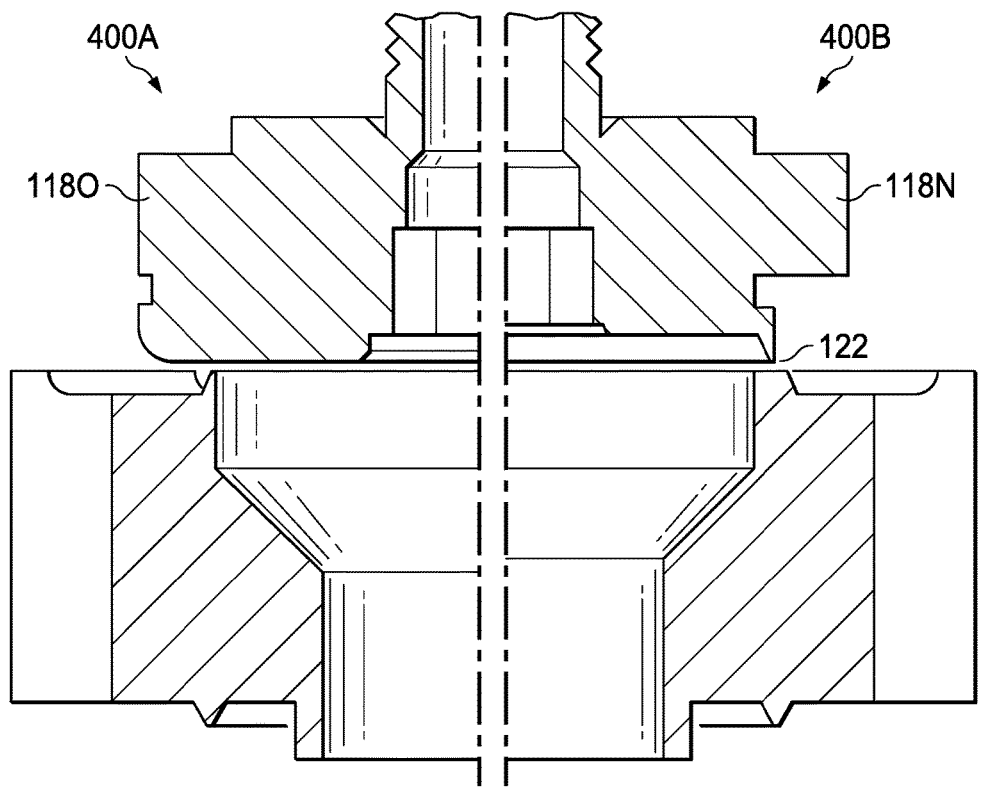

FIG. 4C provides for a side by side comparison of a current valve design 400A with a current valve seat 118O and that a valve design 400B having a valve seat 118N in accordance with a disclosed embodiment. As depicted in FIG. 4C, an outer bottom portion of the valve seat 118N has been removed to avoid or reduce contact with the high velocity flow stream during operation as described in the previously disclosed embodiments. In addition, the valve seat 118N includes a knife edge 122 to reduce the contact to a point to promote flow separation from the valve seat 118N.

Figure 5A:
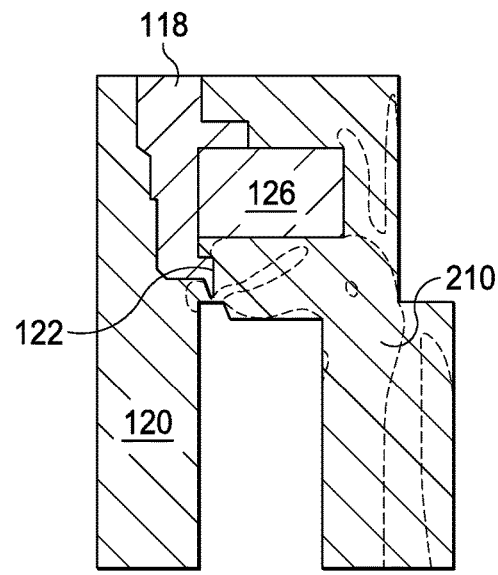
FIG. 5A-5B are diagrams that illustrate examples of a valve with a knife edge seat with flange removed in accordance with the disclosed embodiments.
Figure 5B:
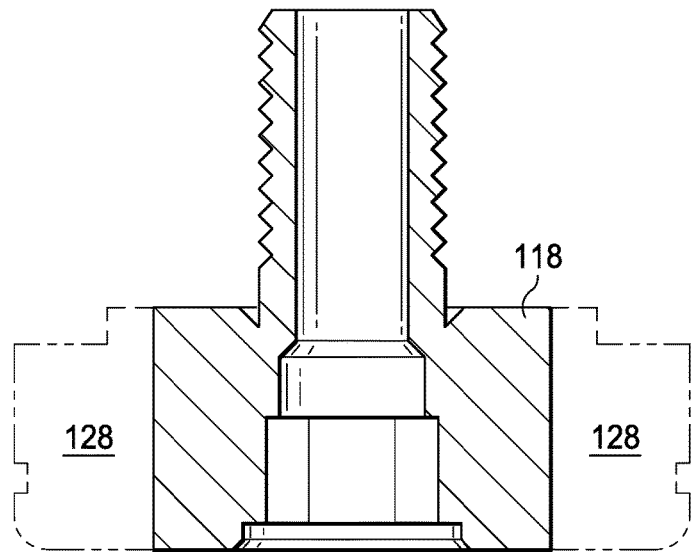

Yet, in another embodiment, a sizable portion of the outer flange of the valve seat 118 may be removed. For example, in FIG. 5A, an outer flange portion 126 of a valve seat 118 having a knife edge 122 may be removed to minimize contact with the high velocity flow stream during operation. The size of the outer flange portion 126 that is removed may vary in different embodiments. Alternatively, in another embodiment, as depicted in FIG. 5B, an entire outer portion 128 of the valve seat 118 may be completely removed. These embodiments further reduce the plan area that flow velocity forces can act on.

Figure 6A:
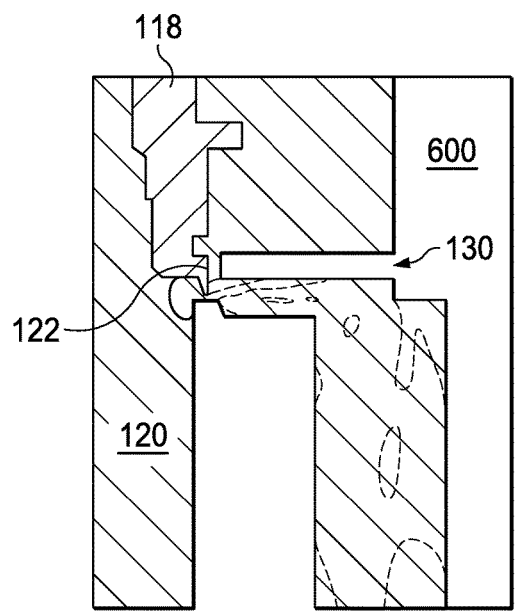
FIG. 6A is a diagram that illustrates an example of a valve with a knife edge seat with flange removed and with a flow shield in accordance with the disclosed embodiments.
Figure 6B:
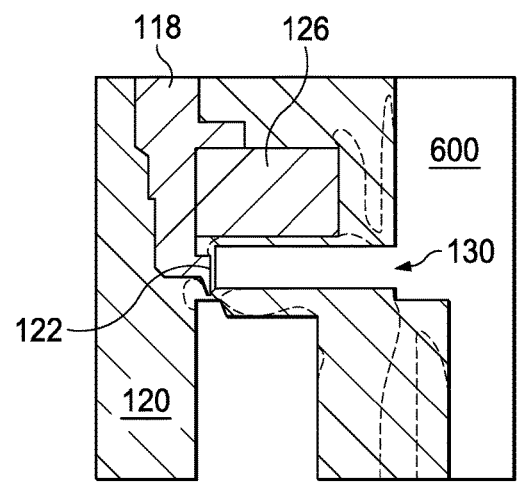
FIG. 6B is a diagram that illustrates an example of a valve with a knife edge seat with flange not removed and with a flow shield in accordance with the disclosed embodiments.

With reference now to FIGS. 6A and 6B, in another embodiment, a flow shield 130 may be added just downstream of the valve seat 118 to eliminate or reduce the recirculation of flow in the seat area that may result in forces that will initiate an oscillation. For example, FIG. 6A illustrates the flow shield 130 being added to the valve seat 118 having the knife edge 122 and the outer flange portion 126 removed as depicted in FIG. 5A. The length, width, and height of the flow shield 130 may vary in different embodiments. For instance, as another example, FIG. 6B illustrates a thicker flow shield 130 being added to the valve seat 118 with the knife edge 122 and wherein the outer flange portion 126 as depicted in FIG. 5A is not removed from the valve seat 118. Still, in certain embodiments, the flow shield 130 is fixed to a body 600 of the valve to eliminate any effects of force variations on the valve position.

Figure 7:
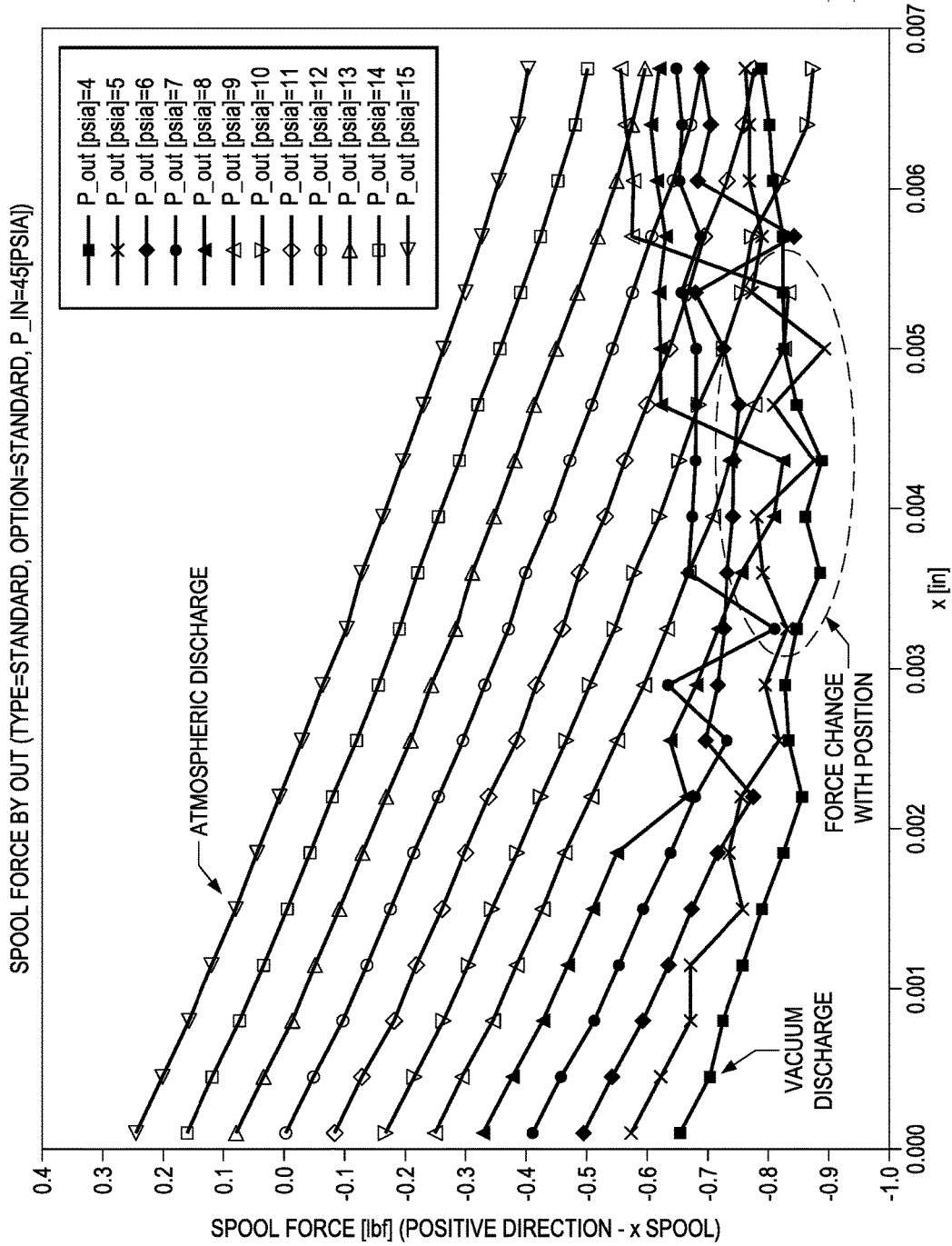
FIG. 7 is a graph that illustrates the calculated force on the spool at various operating positions and outlet pressures for a standard flat seat configuration in accordance with the disclosed embodiments.

FIG. 7 is a graph that illustrates the calculated force on the spool at various operating positions and outlet pressures for a standard flat seat configuration in accordance with the disclosed embodiments. As indicated in FIG. 7, the force on the valve spool assembly is a function of pressure and position. The force changes direction as a function of pressure at high displacements and low outlet pressures.

Figure 8:
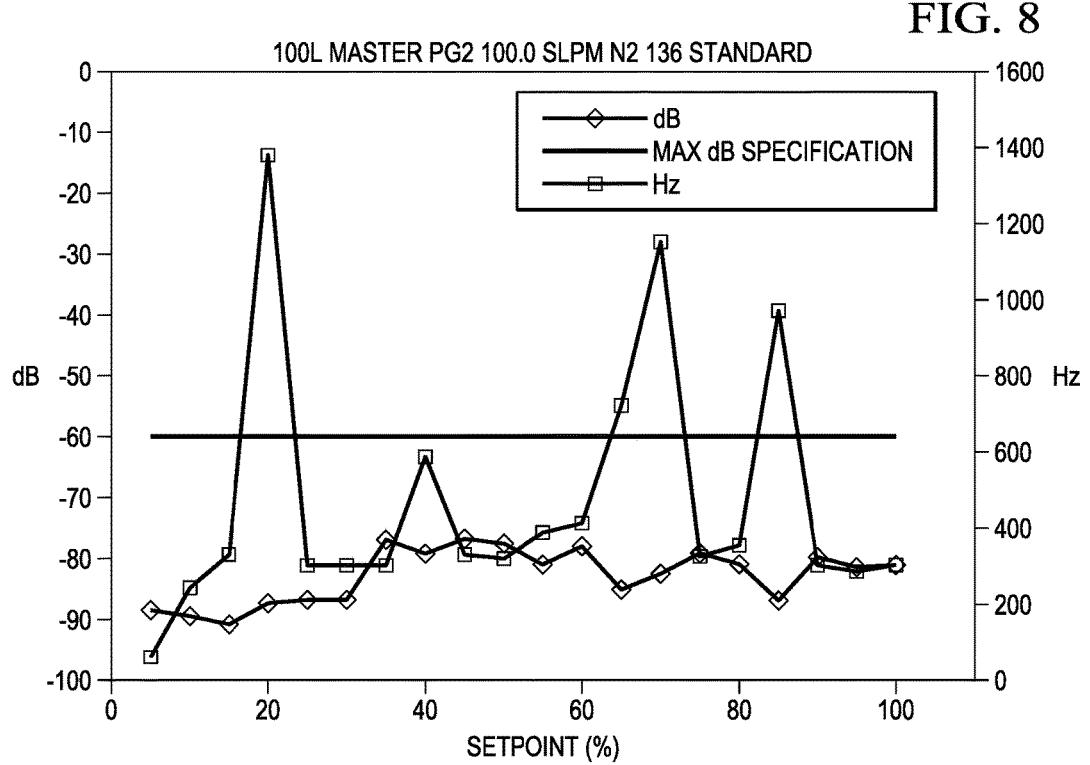
FIG. 8 is a graph that illustrates test data for a standard flat seat valve with atmospheric discharge in accordance with the disclosed embodiments.

FIG. 8 is a graph that illustrates test data for a standard flat seat valve with atmospheric discharge in accordance with the disclosed embodiments. In particular, FIG. 8 depicts the oscillation behavior for a standard flat seat valve over the operating range of setpoints with an inlet pressure of 45 psia and an atmospheric outlet pressure. The oscillation behavior graphs depict two pieces of data: 1) the diamond shape line is the relative amplitude of the vibration as measured by an accelerometer; and 2) the square shape line is the frequency of the oscillation. The inventors of the disclosed embodiments determined based on experimental data that when the relative amplitude of the vibration is above −60 dB, the oscillation it is sufficient to cause a shift in the accuracy of the flow controller. Thus, for illustrative and comparison purposes, a reference line at −60 dB is drawn on all of the test data charts depicted in FIGS. 8, 9, 11-13, and 15-17. Regarding FIGS. 8, 9, 11-13, and 15-17, if the diamond shape line is above the reference line, then the valve is oscillating at a level that will degrade performance. For instance, based on the data in FIG. 8, there is no oscillation of the valve as the diamond shape line is never above the reference line.

Figure 9:
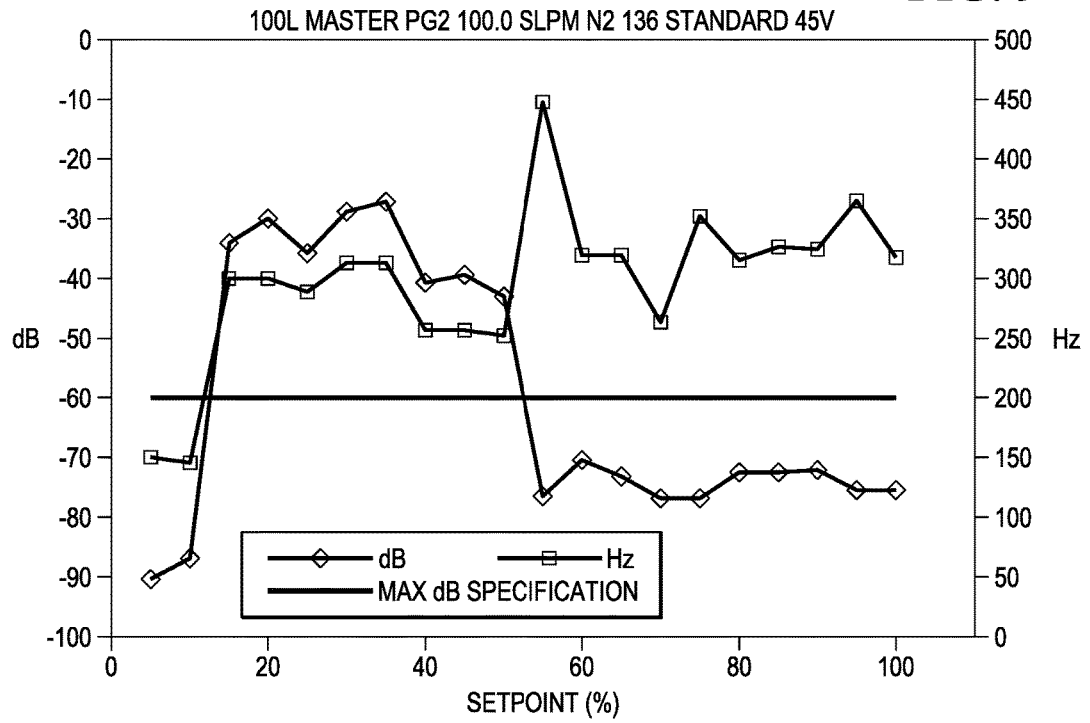
FIG. 9 is a graph that illustrates test data for a standard flat seat valve with vacuum discharge in accordance with the disclosed embodiments.

FIG. 9 is a graph that illustrates test data for a standard flat seat valve with vacuum discharge in accordance with the disclosed embodiments. In particular, FIG. 9 depicts the performance of the same flat seat valve as referenced in FIG. 8 with a 45 psia inlet pressure and vacuum outlet pressure. Under these operating conditions, the valve oscillates at setpoints between 15 and 50% as indicated in FIG. 9.

Figure 10:
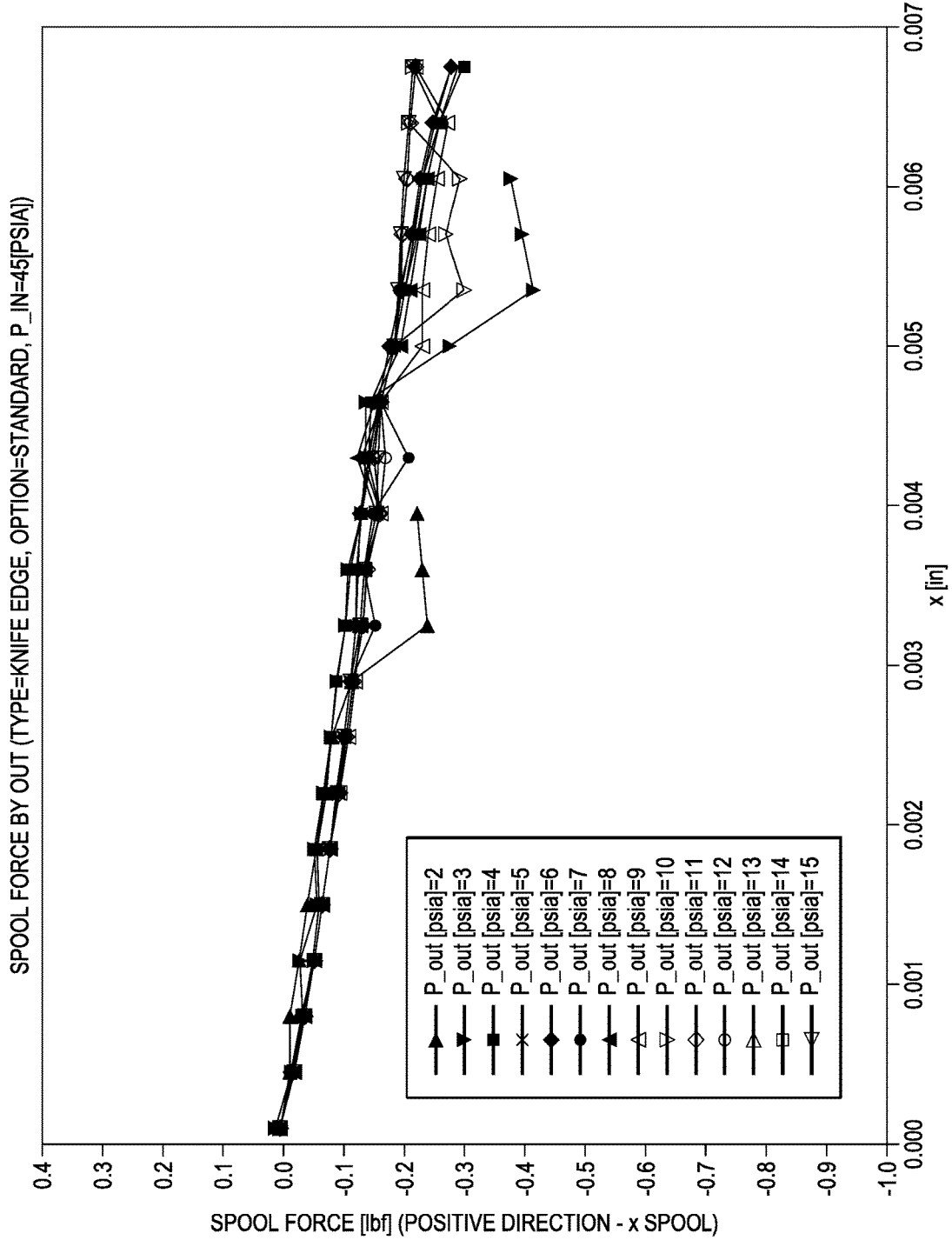
FIG. 10 is a graph that illustrates the calculated force on the spool at various operating positions and outlet pressures for a knife edge seat valve in accordance with the disclosed embodiments.

FIG. 10 is a graph that illustrates the calculated force on the spool at various operating positions and outlet pressures for a knife edge seat valve in accordance with the disclosed embodiments. Example embodiments of a knife edge seat valve are depicted in FIGS. 4A-4C. In contrast to FIG. 7, most of the effect of outlet pressure has been removed and all of the curves fall on top of each other as illustrated in FIG. 10. However, there is still a change in force with position for low outlet pressures.

Figure 11:
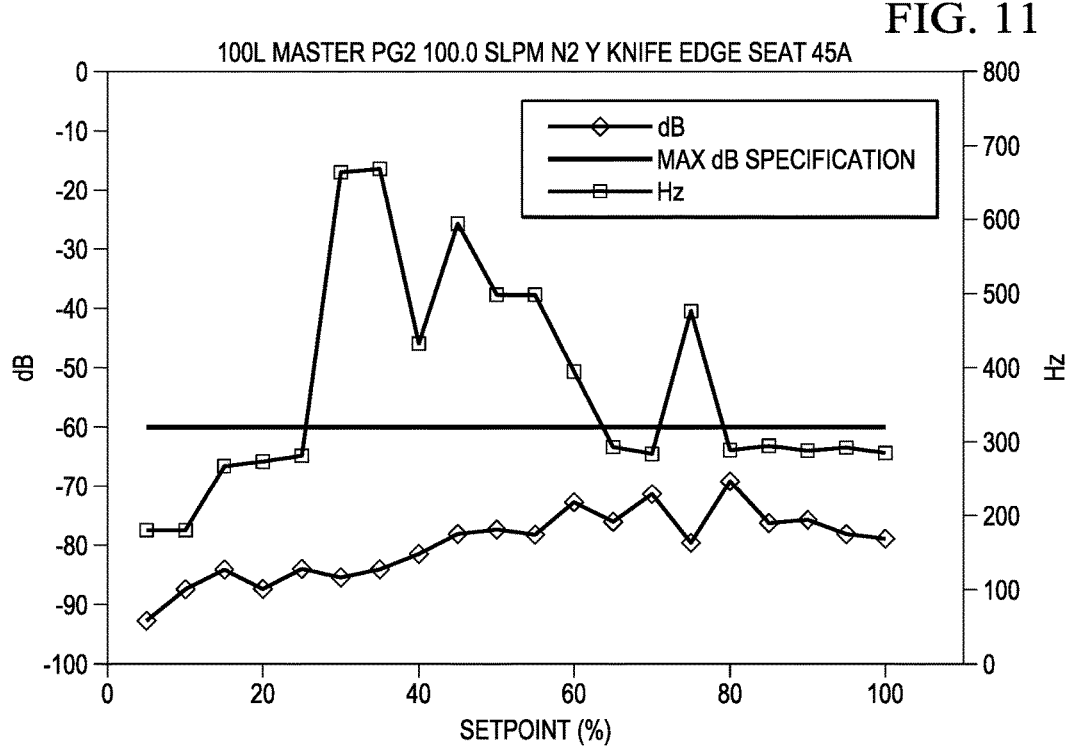
FIG. 11 is a graph that illustrates test data for a knife edge seat valve with atmospheric discharge in accordance with the disclosed embodiments.

FIG. 11 is a graph that illustrates test data for a knife edge seat valve with atmospheric discharge in accordance with the disclosed embodiments. In particular, FIG. 11 depicts the test data for a knife edge seat valve with 45 psia inlet and atmospheric discharge pressure. As discernible from the data, there is no oscillation over the range of operation for this type of valve seat under these parameters.

Figure 12:
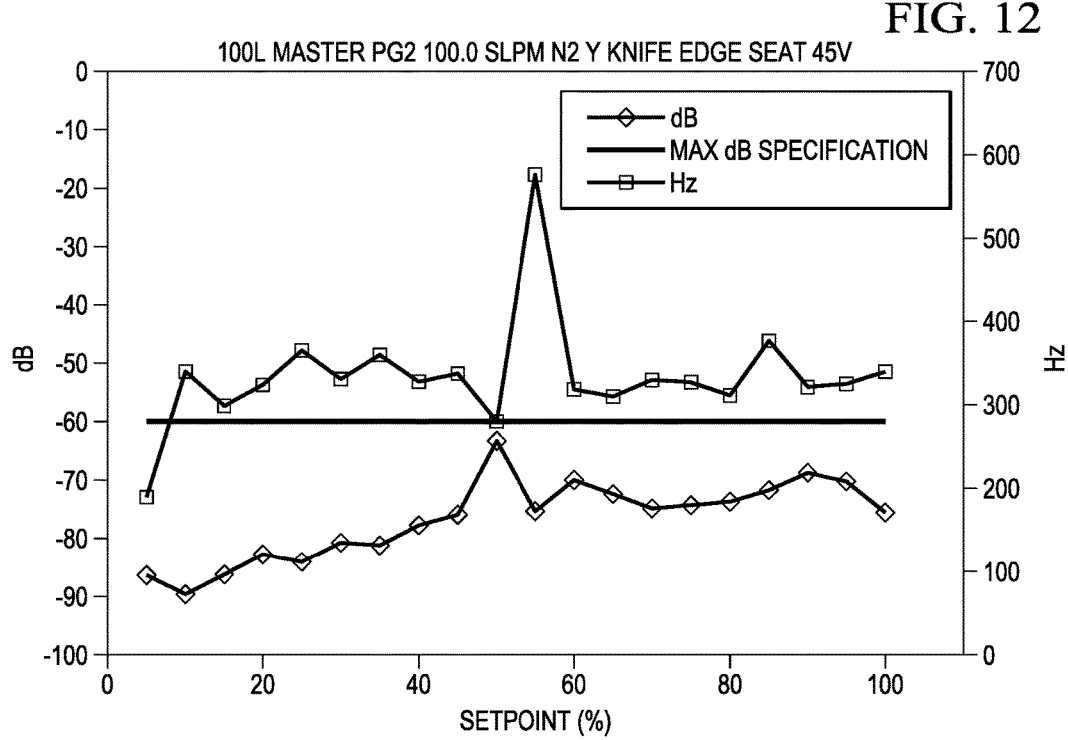
FIG. 12 is a graph that illustrates test data for a knife edge seat valve with vacuum discharge in accordance with the disclosed embodiments.

FIG. 12 is a graph that illustrates test data for a knife edge seat valve with vacuum discharge in accordance with the disclosed embodiments. In particular, FIG. 12 illustrates the test data for a knife edge seat valve with 45 psia inlet and vacuum discharge pressure. Under these conditions, the data indicates no oscillation above the −60 dB limit. However, as illustrated in the graph, the point at 50% setpoint is very close to the limit.

Figure 13:
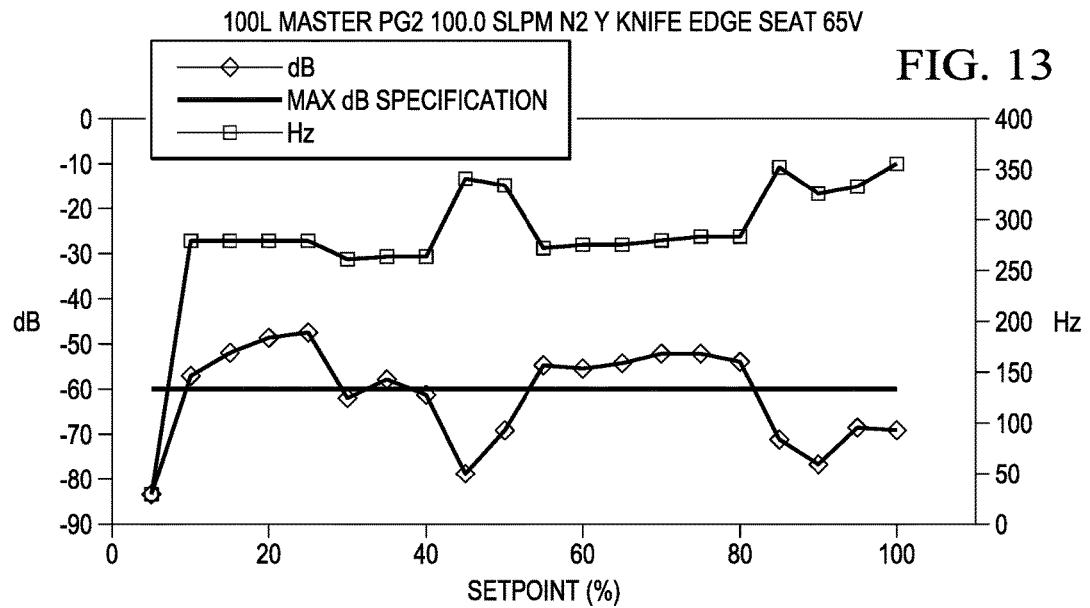
FIG. 13 is a graph that illustrates a second set of test data for a knife edge seat valve with vacuum discharge in accordance with the disclosed embodiments.

FIG. 13 is a graph that illustrates a second set of test data for a knife edge seat valve with vacuum discharge in accordance with the disclosed embodiments. The data of FIG. 13 was determined using the same valve as tested in FIG. 12, except that the inlet pressure has been raised to 65 psia and the outlet pressure remaining at vacuum. Under these more severe conditions, the valve undesirably oscillates freely at most setpoints as indicated in the graph.

Figure 14:
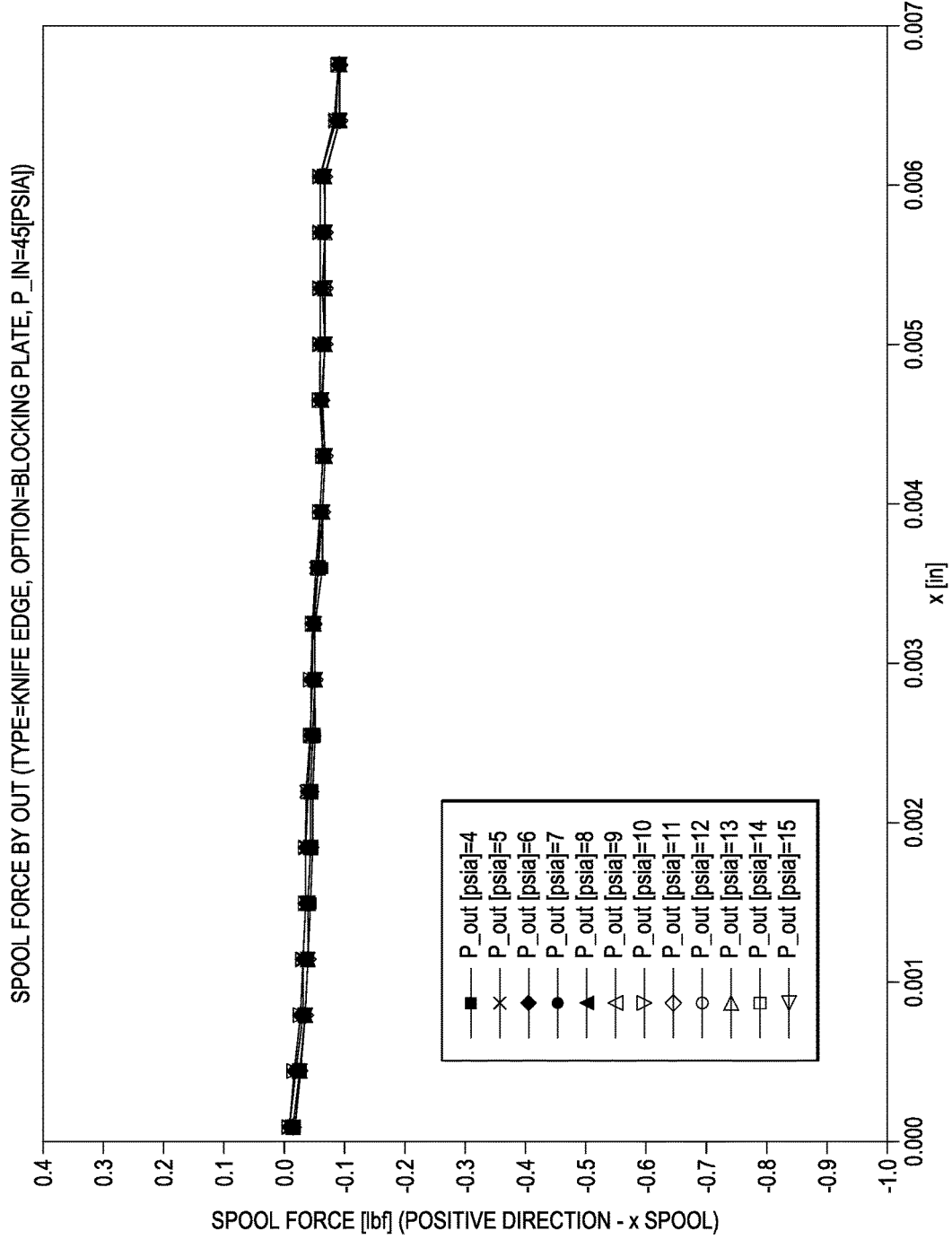
FIG. 14 is a graph that illustrates the calculated force for a valve with a knife edge seat and flow shield in accordance with the disclosed embodiments.

In accordance with another disclosed embodiment, FIG. 14 depicts the force graph for a valve with a knife edge seat and flow shield at 45 psia inlet and having various outlet pressures. Non-limiting examples of this valve configuration is shown in FIGS. 6A-6B. Similar to the test data shown in FIG. 10, the curves for all outlet pressures fall on top of each other. In addition, the force variations at high valve lifts have been eliminated using this type of valve under the set of conditions.

Figure 15:
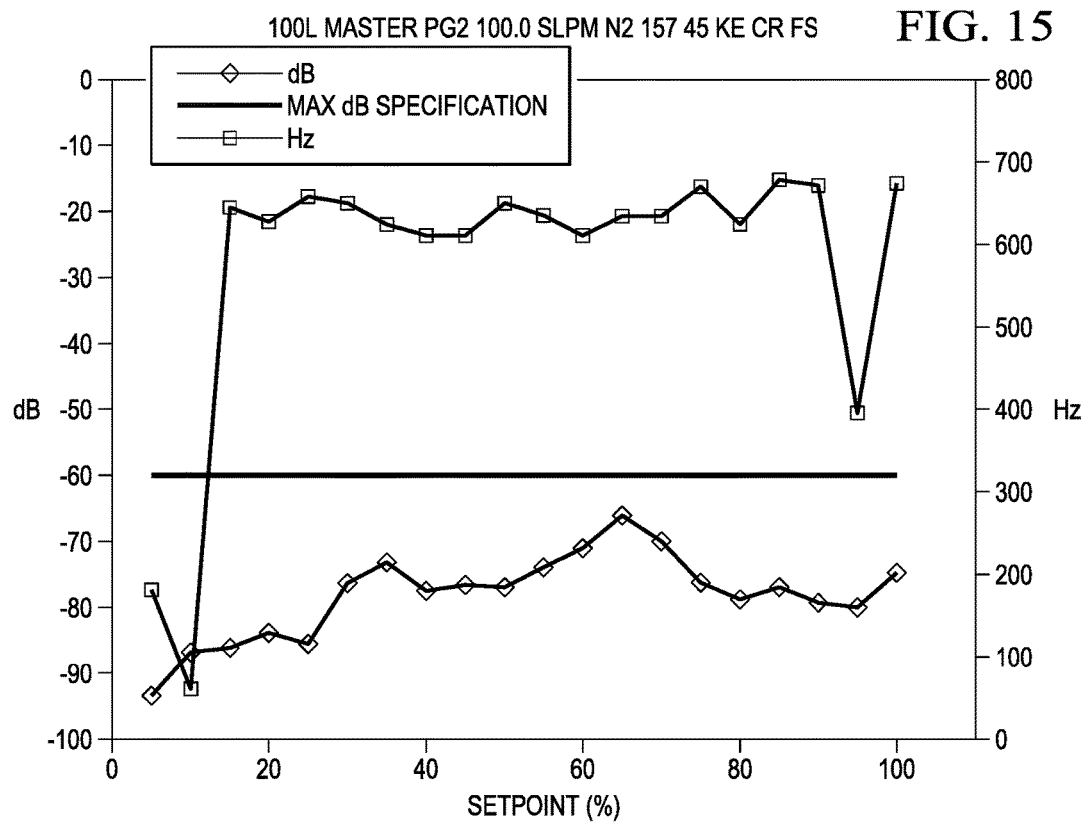
FIG. 15 is a graph that illustrates test data for a valve with a knife edge seat with a flow shield and atmospheric outlet pressure in accordance with the disclosed embodiments.

FIG. 15 is a graph that illustrates test data for a valve with a knife edge seat with a flow shield and atmospheric outlet pressure in accordance with the disclosed embodiments. In particular, FIG. 15 depicts the oscillation graph for a valve with a knife edge seat with a flow shield, 45 psia inlet, and atmospheric outlet pressure. As indicated by the test data, no oscillation is observed at any setpoint using this type of valve under these set of conditions.

Figure 16:
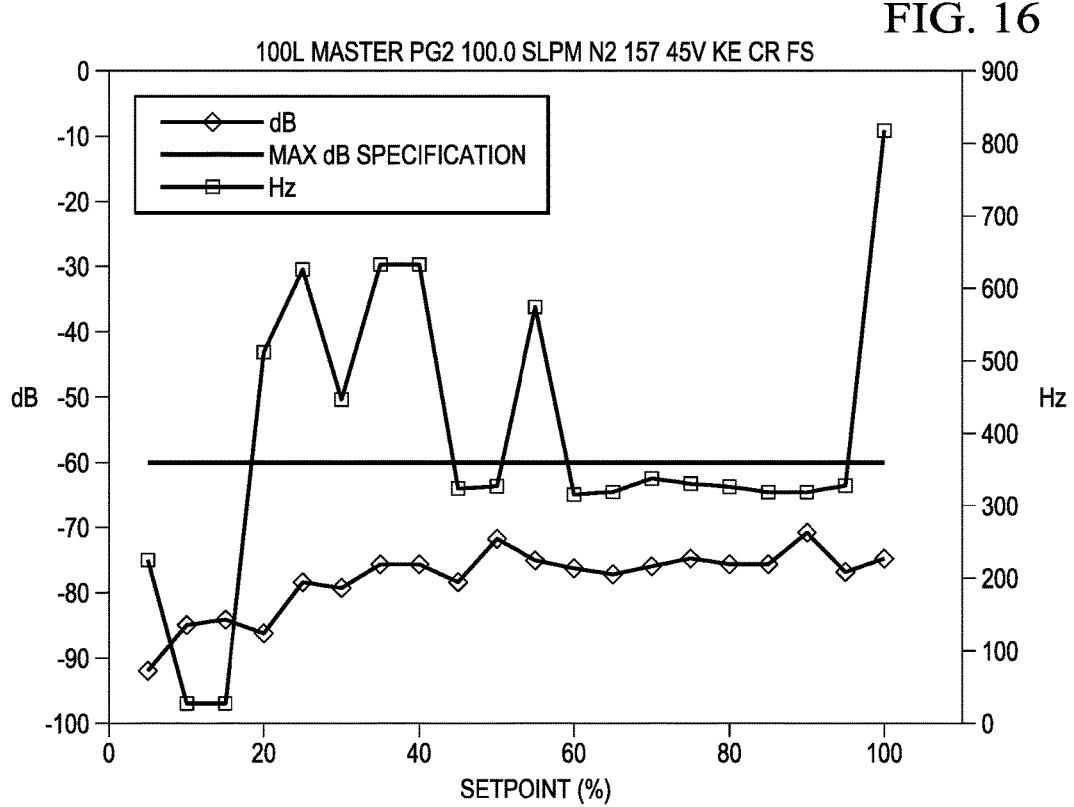
FIG. 16 is a graph that illustrates test data for a valve with a knife edge seat with a flow shield and vacuum outlet pressure in accordance with the disclosed embodiments.

In contrast to FIG. 15, FIG. 16 is an oscillation graph that illustrates the test data for a valve with a knife edge seat with a flow shield at 45 psia inlet and having a vacuum outlet pressure. However, similar to FIG. 15, oscillation is not observed at any setpoint for this type of valve under these set of conditions.

Figure 17:
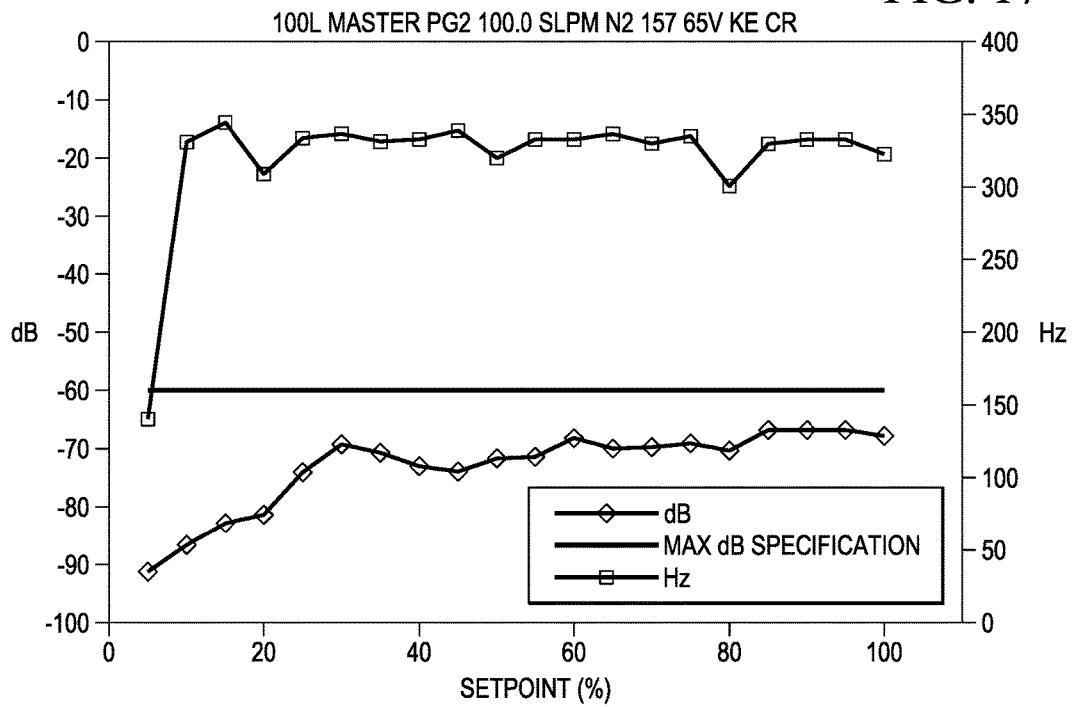
FIG. 17 is a graph that illustrates a second set of test data for a valve with a knife edge seat with a flow shield and vacuum outlet pressure in accordance with the disclosed embodiments.

To further test the effectiveness of this particular embodiment, FIG. 17 depicts the oscillation graph for a valve with a knife edge seat and flow shield at 65 psia inlet and having atmospheric outlet pressure. Even with a 20 psia inlet pressure increase over the test data depicted in FIG. 15, oscillation is still not observed at any setpoint.

Figure 18:
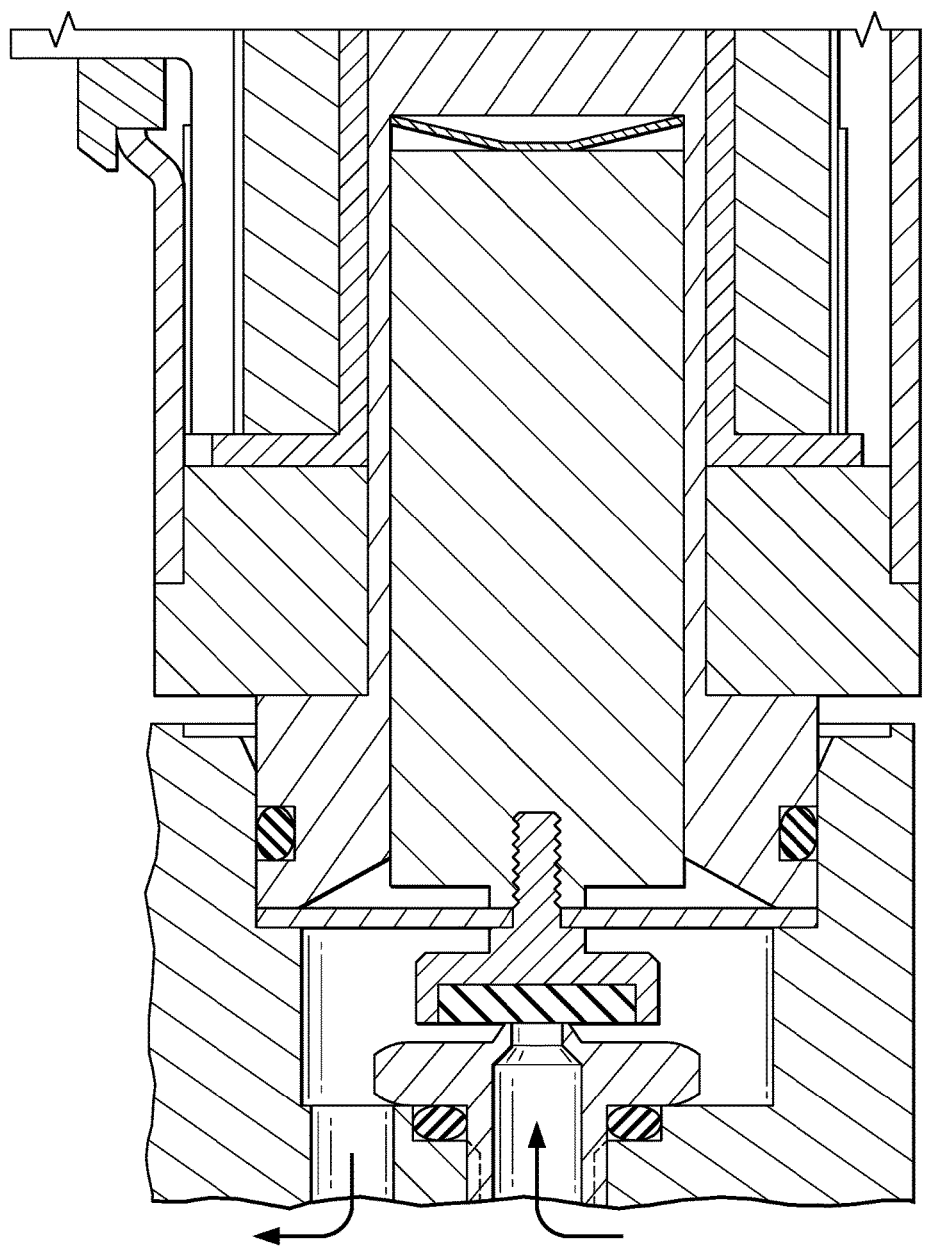
FIG. 18 is a diagram that illustrates an example of a conventional non-balanced valve with a flat seat in accordance with the disclosed embodiments.
Figure 19:
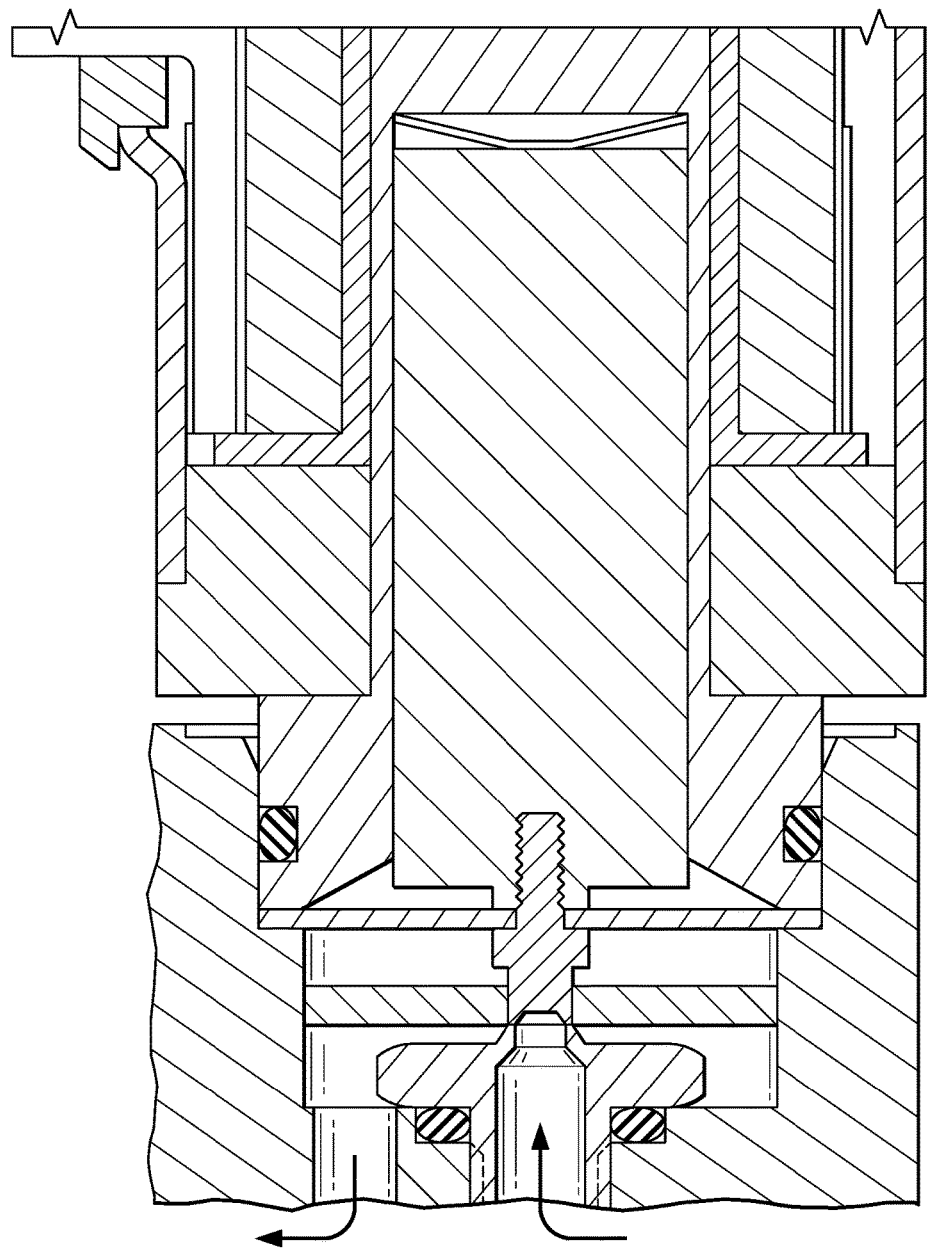
FIG. 19 is a diagram that illustrates an example of a conventional non-balanced valve with a knife edge seat and flow shield in accordance with the disclosed embodiments.

According, the disclosed embodiments provide a valve seat that reduces or eliminates the oscillation problem that occurs in conventional valve seat design. Although, the graphs and diagrams in this disclosure refer mostly to a force balanced valve design, the disclosed embodiments would work equally as well with a conventional force actuated valve that does not have the pressure balance feature. For instance, FIG. 18 depicts a conventional non-balanced valve with a flat seat in which the disclosed embodiments may be applied. For example, FIG. 19 depicts a conventional non-balanced valve with the knife edge seat 122 and flow shield 130 features as disclosed herein.

Figure 20:
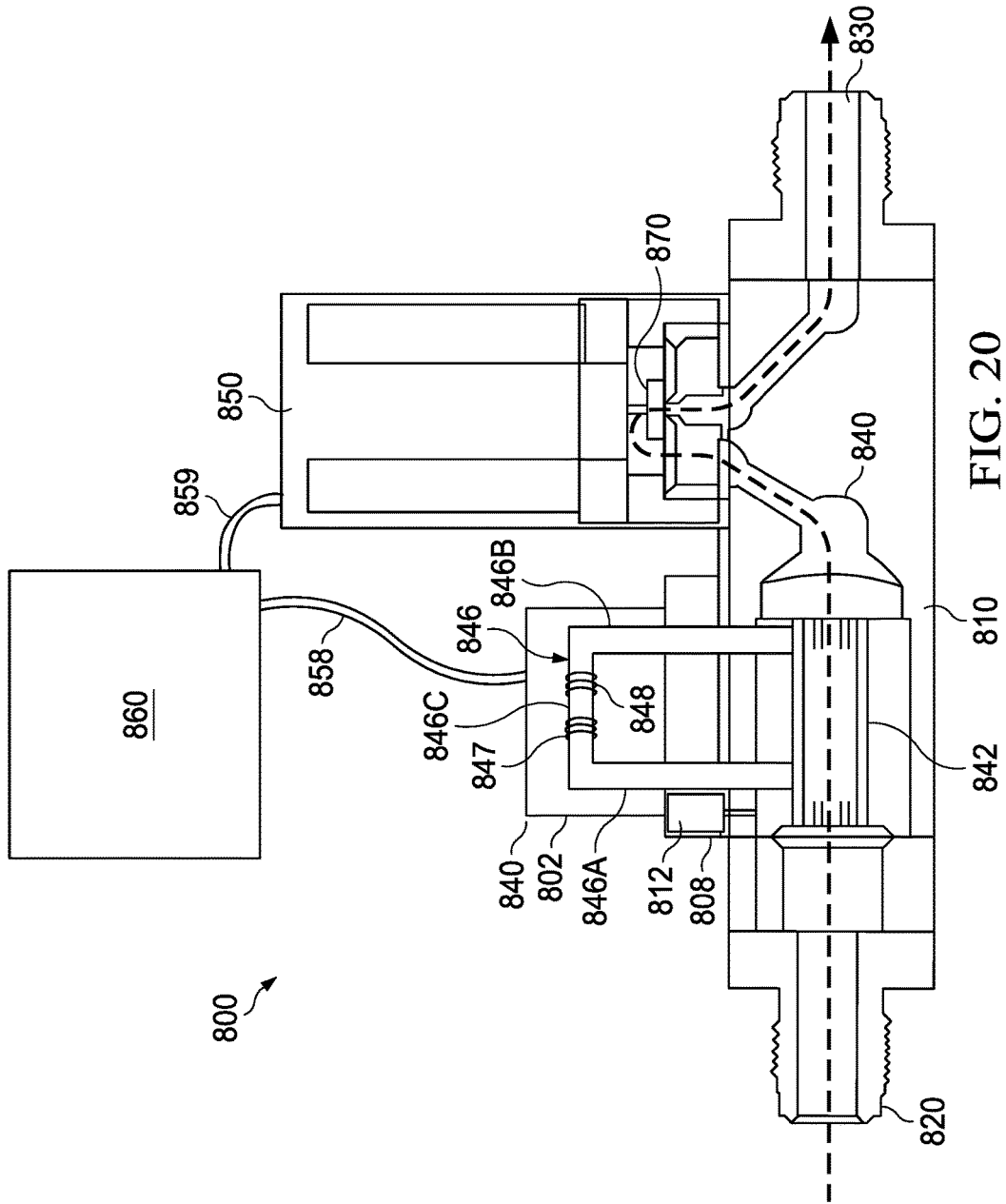
FIG. 20 is a diagram depicting an example of a mass flow controller in which the disclosed valve embodiments may be utilized for controlling flow.

FIG. 20 is a diagram depicting an example of a mass flow controller (MFC) 800 in which the disclosed valve embodiments may be utilized for controlling flow. The mass flow controller 800 includes a block 810, which is a platform on which components of the MFC are mounted. For instance, in one embodiment, a thermal mass flow meter 840 and a valve assembly 850 are mounted on the block 810 between a fluid inlet 820 and a fluid outlet 830. The valve assembly 850 includes a valve 870, which may be any of the types of valves disclosed herein. The thermal mass flow meter 840 includes a bypass 842 through which typically a majority of fluid flows and a thermal flow sensor 846 through which a smaller portion of the fluid flows.

Thermal flow sensor 846 is contained within a sensor housing 802 mounted on a mounting plate or base 808. Sensor 846 is a small diameter tube, typically referred to as a capillary tube, with a sensor inlet portion 846A, a sensor outlet portion 846B, and a sensor measuring portion 846C about which two resistive coils or windings 847 and 848 are disposed. In operation, electrical current is provided to the two resistive windings 847 and 848, which are in thermal contact with the sensor measuring portion 846C. The current in the resistive windings 847, 848 heats the fluid flowing in measuring portion 846 to a temperature above that of the fluid flowing through the bypass 842. The resistance of windings 847 and 848 varies with temperature. As fluid flows through the sensor conduit, heat is carried from the upstream resistor 847 toward the downstream resistor 848, with the temperature difference being proportional to the mass flow rate through the sensor.

An electrical signal related to the fluid flow through the sensor is derived from the two resistive windings 847 and 848. The electrical signal may be derived in a number of different ways, such as from the difference in the resistance of the resistive windings or from a difference in the amount of energy provided to each resistive winding to maintain each winding at a particular temperature. Examples of various ways in which an electrical signal correlating to the flow rate of a fluid in a thermal mass flow meter may be determined are described, for example, in commonly owned U.S. Pat. No. 6,845,659, which is hereby incorporated by reference. The electrical signals derived from the resistive windings 847 and 848 after signal processing comprise a sensor output signal.

The sensor output signal is correlated to mass flow in the mass flow meter so that the fluid flow can be determined when the electrical signal is measured. The sensor output signal is typically first correlated to the flow in sensor 846, which is then correlated to the mass flow in the bypass 842, so that the total flow through the flow meter can be determined and the valve 870 can be controlled accordingly. The correlation between the sensor output signal and the fluid flow is complex and depends on a number of operating conditions including fluid species, flow rate, inlet and/or outlet pressure, temperature, etc.

The process of correlating raw sensor output to fluid flow entails tuning and/or calibrating the mass flow controller. For example, the mass flow sensor may be tuned by running known amounts of a known fluid through the sensor portion and adjusting certain signal processing parameters to provide a response that accurately represents fluid flow. For example, the output may be normalized, so that a specified voltage range, such as 0 V to 5 V of the sensor output, corresponds to a flow rate range from zero to the top of the range for the sensor. The output may also be linearized, so that a change in the sensor output corresponds linearly to a change in flow rate. For example, doubling of the fluid output will cause a doubling of the electrical output if the output is linearized.

A bypass may then be mounted to the sensor, and the bypass is characterized with the known fluid to determine an appropriate relationship between fluid flowing in the mass flow sensor and the fluid flowing in the bypass at various known flow rates, so that the total flow through the flow meter can be determined from the sensor output signal. In certain embodiments, no bypass is used, and the entire flow passes through the sensor. The mass flow sensor portion and bypass may then be mated to the valve 870 and control electronics portions and then tuned again, under known conditions. The responses of the control electronics and the valve 870 are then characterized so that the overall response of the system to a change in set point or input pressure is known, and the response can be used to control the system to provide the desired response.

Control electronics 860 control the position of the valve 870 in accordance with a set point indicating the desired mass flow rate, and an electrical flow signal from the mass flow sensor indicative of the actual mass flow rate of the fluid flowing in the sensor conduit. Traditional feedback control methods such as proportional control, integral control, proportional-integral (PI) control, derivative control, proportional-derivative (PD) control, integral-derivative (ID) control, and proportional-integral-derivative (PID) control are then used to control the flow of fluid in the mass flow controller. A control signal (e.g., a valve drive signal) is generated based upon an error signal that is the difference between a set point signal indicative of the desired mass flow rate of the fluid and a feedback signal that is related to the actual mass flow rate sensed by the mass flow sensor. The valve 870 is positioned in the main fluid flow path (typically downstream of the bypass and mass flow sensor) and can be controlled (e.g., opened or closed) to vary the mass flow rate of fluid flowing through the main fluid flow path, the control being provided by the mass flow controller.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, elements, and/or components, but do not preclude the presence or addition of one or more other features, elements, components, and/or groups thereof. The corresponding structures, materials, acts, and equivalents of all means or step plus function elements in the claims below are intended to include any structure, material, or act for performing the function in combination with other claimed elements as specifically claimed.

While specific details about the above embodiments have been described, the above descriptions are intended merely as example embodiments and are not intended to limit the structure or implementation of the disclosed embodiments. Many modifications and variations will be apparent to those of ordinary skill in the art without departing from the scope and spirit of the invention. The illustrated embodiments were chosen and described to explain the principles of the claimed inventions and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A mass flow controller for controlling a flow of a fluid, the mass flow controller comprising:
    an inlet for receiving the fluid;
    a flow path in which the fluid passes through the mass flow controller;
    a mass flow meter for providing a signal corresponding to mass flow of the fluid through the flow path;
    a force actuated modulating control valve for regulating the flow of the fluid out of an outlet of the mass flow controller, the force actuated modulating control valve comprising a metering orifice within a metering orifice body and a valve seat having a first metering side surface downstream from a metering gap distanced further from the metering orifice body than a second metering side surface of the valve seat upstream from the metering gap to reduce contact with a high velocity flow stream during operation;
    a flow shield positioned downstream from the metering gap of the valve seat to prevent a high velocity fluid from circulating toward a surface of the valve seat, wherein the flow shield is fixed to a body of the force actuated modulating control valve; and
    a controller configured to apply a valve control signal to adjust the force actuated modulating control valve to a desired valve position to control the flow of the fluid out of an outlet of the mass flow controller.

2. The mass flow controller of claim 1, wherein the valve seat comprises a knife edge seat, and the valve seat has a reduced diameter immediately adjacent to the knife edge seat in comparison to a diameter of the valve seat further away from the knife edge seat.

3. The mass flow controller of claim 2, wherein the valve seat has the knife edge seat such that the metering gap is at an outer edge of the second metering side surface of the valve seat.

4. The mass flow controller of claim 3, wherein the flow shield is positioned outside of the metering gap of the valve seat to prevent the high velocity fluid from circulating toward other parts of a spool assembly, wherein the valve seat comprises a portion of the spool assembly.

5. The mass flow controller of claim 1, wherein a diameter of the second metering side surface of the valve seat is greatest at the metering gap of the valve seat.

6. The mass flow controller of claim 5, wherein the valve seat has the knife edge seat such that the metering gap is at an outer edge of the second metering side surface of the valve seat.

7. The mass flow controller of claim 1, wherein the force actuated modulating control valve is a direct acting solenoid valve.

8. The mass flow controller of claim 1, wherein the force actuated modulating control valve is a pilot actuated bellows valve.

9. The mass flow controller of claim 1, wherein the force actuated modulating control valve is a non-balanced valve.

10. A mass flow controller for controlling a flow of a fluid, the mass flow controller comprising:
   an inlet for receiving the fluid;
   a flow path in which the fluid passes through the mass flow controller;
   a mass flow meter for providing a signal corresponding to mass flow of the fluid through the flow path;
   a force actuated modulating control valve for regulating the flow of the fluid out of an outlet of the mass flow controller, the force actuated modulating control valve comprising a metering orifice within a metering orifice body and a valve seat having a knife edge seat, wherein a first metering side surface of the valve seat downstream from the knife edge seat is distanced further from the metering orifice body than a second metering side surface of the valve seat upstream from the knife edge seat to reduce contact with a high velocity flow stream during operation;
   a flow shield positioned downstream from a metering gap of the valve seat to restrict a high velocity fluid from circulating toward a surface of the valve seat, wherein the flow shield is fixed to a body of the force actuated modulating control valve; and
   a controller configured to apply a valve control signal to adjust the force actuated modulating control valve to a desired valve position to control the flow of the fluid out of an outlet of the mass flow controller.

11. The mass flow controller of claim 10, wherein the valve seat has a reduced diameter immediately adjacent to the knife edge seat in comparison to a diameter of the valve seat further away from the knife edge seat.

12. The mass flow controller of claim 11, wherein the valve seat has the knife edge seat such that the metering gap is at an outer edge of the valve seat.

13. The mass flow controller of claim 10, wherein a diameter of the valve seat is greatest at the metering gap of the valve seat.

14. The mass flow controller of claim 13, wherein the valve seat has the knife edge seat such that the metering gap is at an outer edge of the valve seat.

15. The mass flow controller of claim 10, wherein fluid forces are transmitted to the body of the force actuated modulating control valve.

16. The mass flow controller of claim 10, wherein the force actuated modulating control valve is a direct acting solenoid valve.

17. The mass flow controller of claim 10, wherein the force actuated modulating control valve is a pilot actuated bellows valve.

18. The mass flow controller of claim 10, wherein the force actuated modulating control valve is a non-balanced valve.

* * * * *